United States Patent
O'Meara (10) Patent No.: US 6,642,712 B2
(45) Date of Patent: Nov. 4, 2003

(54) DEVICE AND METHOD FOR PREDICTING ROTATIONAL POSITIONS OF A ROTATING SHAFT

(75) Inventor: Thomas P. O'Meara, Redondo Beach, CA (US)

(73) Assignee: General Motors Corporation, Detroit, MI (US)

(*) Notice: Subject to any disclaimer, the term of this patent is extended or adjusted under 35 U.S.C. 154(b) by 71 days.

(21) Appl. No.: 09/829,030

(22) Filed: Apr. 9, 2001

(65) Prior Publication Data

US 2002/0171419 A1 Nov. 21, 2002

(51) Int. Cl.⁷ .............................. G01B 7/00; G01P 3/56
(52) U.S. Cl. .................. 324/207.25; 324/166; 702/145; 702/151
(58) Field of Search ................ 324/207.25, 207.11, 324/160, 161, 166; 123/349, 350, 612, 617; 318/638, 647; 702/145, 147, 151

(56) References Cited

U.S. PATENT DOCUMENTS 3,767,902 A * 10/1973 Estes, III et al. ............ 702/151

* cited by examiner

Primary Examiner—Walter E. Snow
(74) Attorney, Agent, or Firm—Christopher DeVries (57) ABSTRACT

A device for implementing a method for predicting rotational positions of a rotating shaft is disclosed. A motor shaft is rotated over a range of rotation. The device detects each incremental rotation position of the motor shaft from a set of incremental rotational positions being spaced by a fixed increment. Prior to a change in the rotational speed of the motor shaft, the device generates a prediction of each rotational position. When a detected incremental rotation indicates a change in rotational speed of the motor shaft, the device modifies the prediction of each motor shaft position in a continuous manner.

9 Claims, 10 Drawing Sheets

DEVICE AND METHOD FOR PREDICTING ROTATIONAL POSITIONS OF A ROTATING SHAFT

BACKGROUND OF THE INVENTION

1. Field of the Invention

The present invention generally relates to position prediction devices and methods. The present invention particularly relates to a device and a method for predicting shaft rotational positions with the predictions being utilized to control a magnitude and a duration of current being applied to stator windings of a motor.

2. Description of the Related Art

A prior art motor shaft position prediction technique involves a course-resolution position sensor 16, a course-resolution position sensor 17, and a course-resolution position sensor 18 disposed in an equidistant of 60 degrees about a motor shaft 10 and a rotor 11 attached thereto as shown in FIGS. 1A–1D. Referring to FIGS. 1A–1D, a magnet 12 displaying a north surface N, a magnet 13 displaying a south surface S, a magnet 14 displaying a north surface N, and a magnet 15 displaying a south surface S are attached to rotor 11.

Figure 1A:
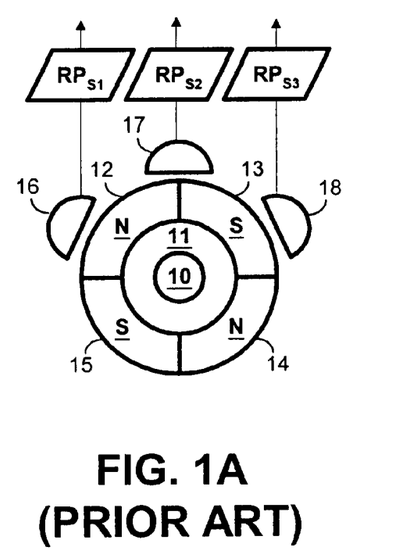
FIG. 1A is a first schematic diagram of a motor shaft, a rotor, magnets, and sensors as known in the prior art.
Figure 1B:
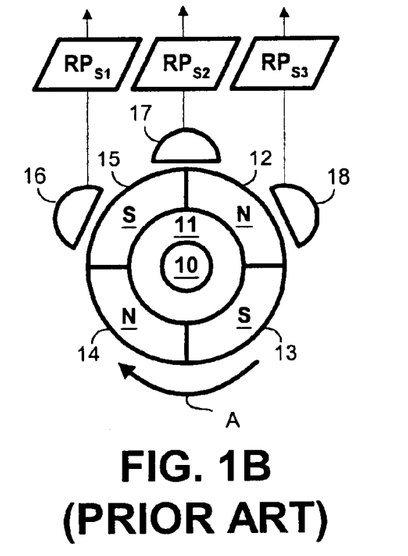
FIG. 1B is a second schematic diagram of a motor shaft, a rotor, magnets, and sensors as known in the prior art.
Figure 1C:
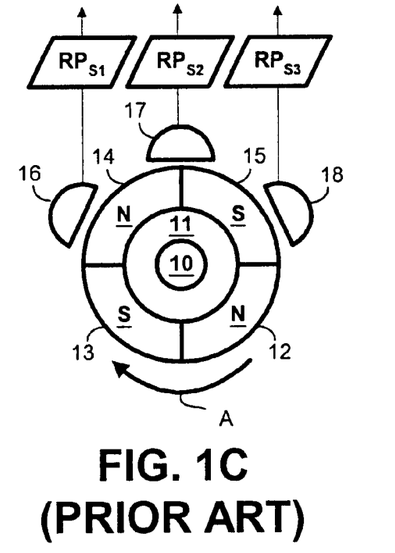
FIG. 1C is a third schematic diagram of a motor shaft, a rotor, magnets, and sensors as known in the prior art.
Figure 1D:
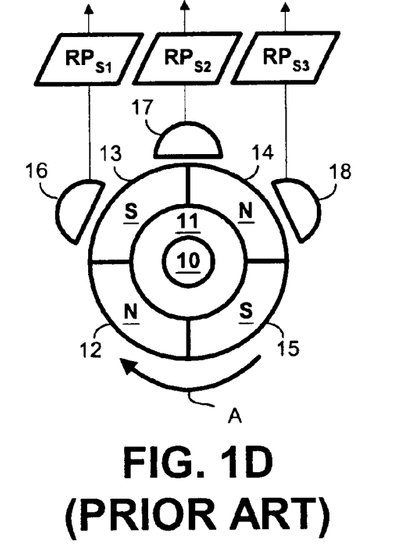
FIG. 1D is a fourth schematic diagram of a motor shaft, a rotor, magnets, and sensors as known in the prior art.

Each magnet 12–15 extends a radial distance of 90 degrees whereby collectively magnets 12–15 extend over a 360-degree radius of rotor 11. FIG. 1A illustrates shaft 10 and rotor 11 at a 0 degree or 360 degree position. FIG. 1B illustrates shaft 10 and rotor 11 at a 90 degree position whereby magnets 12–15 have been rotated 90 degrees in a clockwise direction as indicated by arrow A. FIG. 1C illustrates shaft 10 and rotor 11 at a 180 degree position whereby magnets 12–15 have been rotated an additional 90 degrees in a clockwise direction as indicated by arrow A. FIG. 1D illustrates shaft 10 and rotor 11 at a 270 degree position whereby magnets 12–15 have been rotated an additional 90 degrees in a clockwise direction as indicated by arrow A.

Sensor 16 provides a rotational positional signal $RP_{S1}$ at a logic high level LH whenever sensor 16 is predominately facing magnet 12 or magnet 14, and provides rotational positional signal $RP_{S1}$ at a logic low level LL whenever sensor 16 is predominately facing magnet 13 or magnet 15.

Sensor 17 provides a rotational positional signal $RP_{S2}$ at a logic high level LH whenever sensor 17 is predominately facing magnet 12 or magnet 14, and provides rotational positional signal $RP_{S2}$ at a logic low level LL whenever sensor 17 is predominately facing magnet 13 or magnet 15.

Sensor 18 provides a rotational positional signal $RP_{S3}$ at a logic high level LH whenever sensor 18 is predominately facing magnet 12 or magnet 14, and provides rotational positional signal $RP_{S3}$ at a logic low level LL whenever sensor 18 is predominately facing magnet 13 or magnet 15.

The following TABLE 1 illustrates the logic levels of rotational position signals $RP_{S1-S3}$ for each incremental rotational position of shaft 10 and rotor 11:

TABLE 1

| $RP_{S1}$ | $RP_{S2}$ | $RP_{S3}$ | INCREMENTAL ROTATONAL POSITIONS |
|---|---|---|---|
| LH | LH | LL | 0°/360° |
| LL | LH | LL | 30° |
| LL | LH | LH | 60° |
| LL | LL | LH | 90° |
| LH | LL | LH | 120° |
| LH | LL | LL | 150° |
| LH | LH | LL | 180° |
| LL | LH | LL | 210° |
| LL | LH | LH | 240° |
| LL | LL | LH | 270° |
| LH | LL | LH | 300° |
| LH | LL | LL | 330° |

Figure 2:
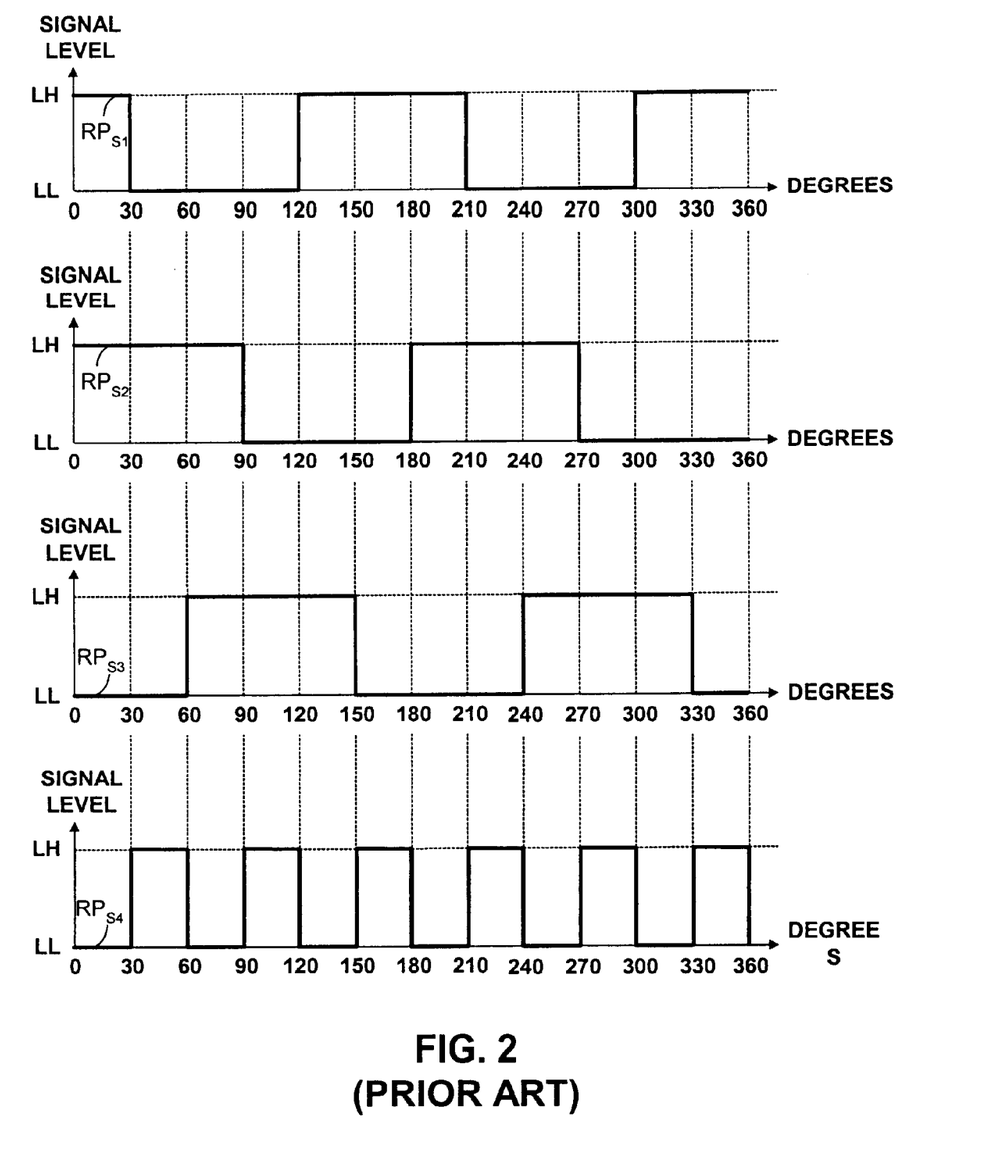
FIG. 2 illustrates graphs of signal levels of rotational position signals of the FIGS. 1A–1D motor shaft over a 360 degree range of rotation as known in the art.

From TABLE 1, it is understood that, for every 30 degrees incremental position of motor shaft 10 and rotor 11, only one of the rotational position signals $RP_{S1-S3}$ transitions from one of the logic levels to the other logic level. As such, a logic unit (not shown) is utilized to provide a rotational positional signal $RP_{S4}$ as a function of each logic level transition of rotational positional signals $RP_{S1-S3}$, whereby, as known in the art, rotational positional signal $RP_{S4}$ is an indication of each 30-degree incremental rotation position of motor shaft 10 and rotor 11 as illustrated in FIG. 2.

Figure 3A:
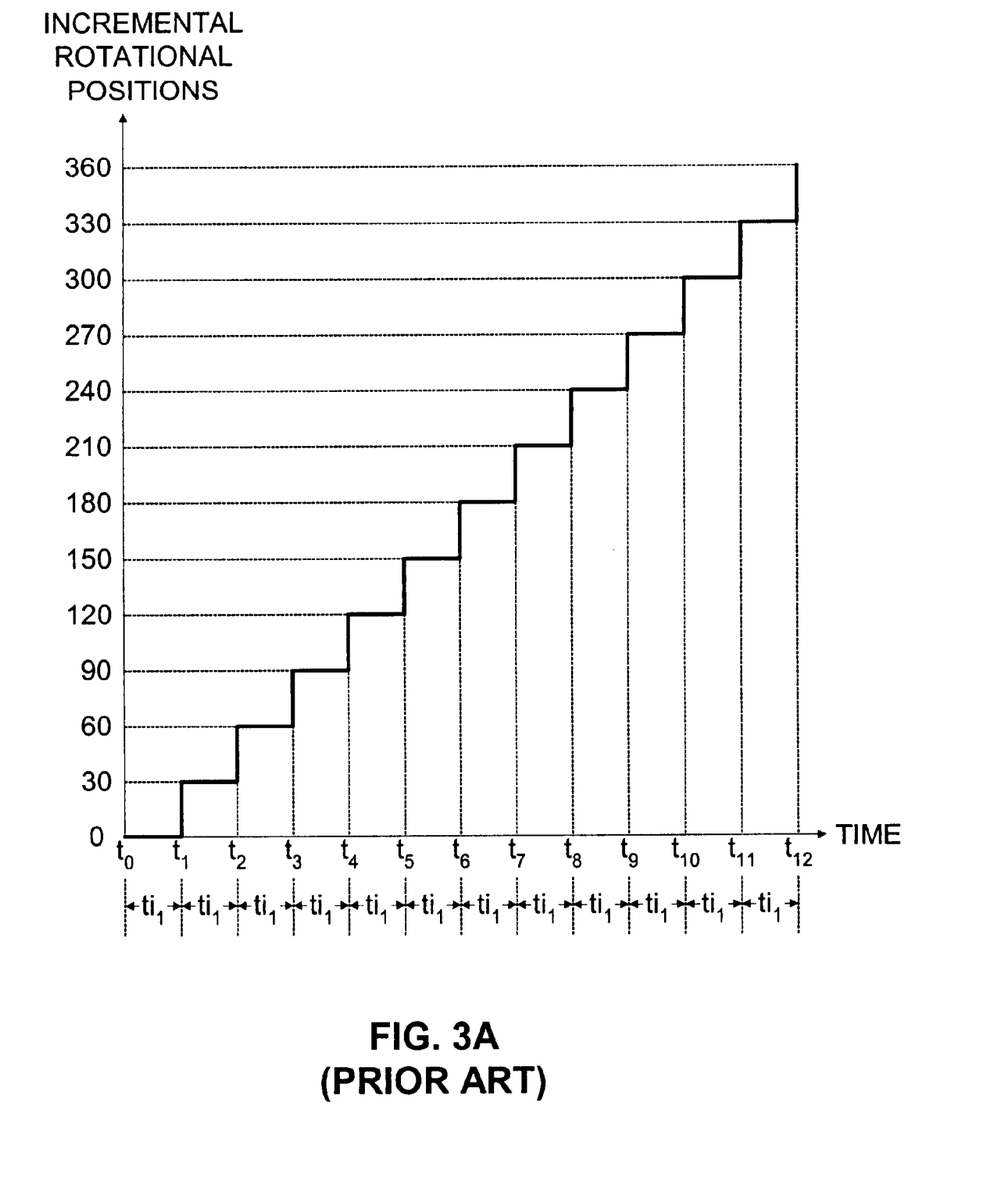
FIG. 3A illustrates a graph of incremental rotational position detections of a motor shaft experiencing a constant speed as indicated by a rotational position signal over time as known in the art.

A graph illustrating time stamps $t_{0-12}$ of each transition of rotational positional signal $RP_{S4}$ over the 360 degree rotation of motor shaft 10 and rotor 11 with motor shaft 10 and rotor 11 experiencing a constant rotational speed as known in the art is shown in FIG. 3A. Referring to FIG. 3A, each 30-degree incremental rotation of motor shaft 10 and rotor 11 occurs every time interval $ti_1$.

Figure 3B:
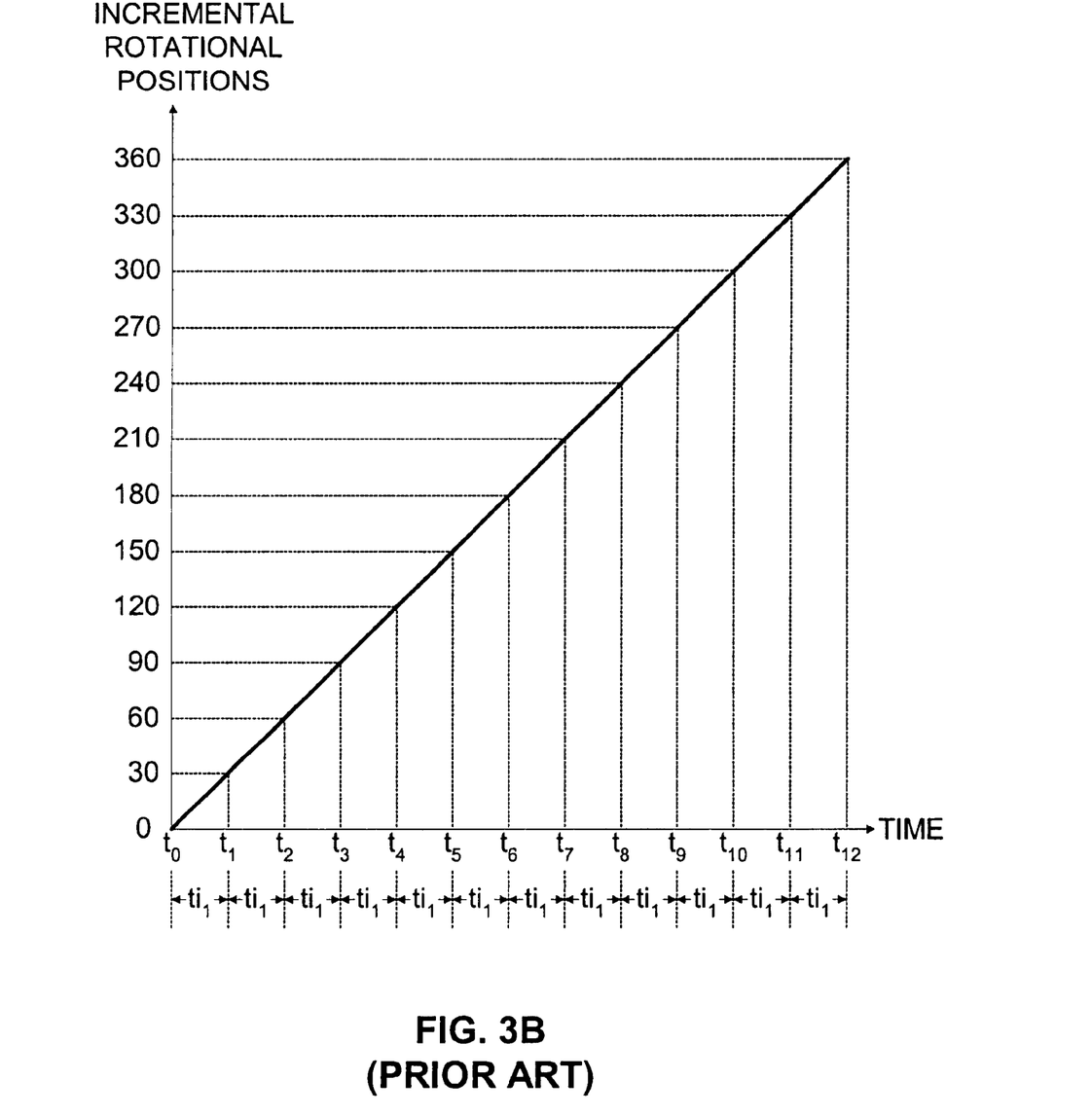
FIG. 3B illustrates a graph of a continuous prediction of the rotational positions of the motor shaft as a function of the FIG. 3A incremental rotational position detections as known in the art.

A graph illustrating a prediction, as known in the art, of each position of motor shaft 10 and rotor 11 over the 360 degree rotation of motor shaft 10 and rotor 11 with motor shaft 10 and rotor 11 experiencing a constant rotational speed during time stamps $t_{0-12}$ is shown in FIG. 3B. Referring additionally to FIG. 3B, the prediction of each position is based on a constant slope equal to 30 degrees divided by time interval $ti_1$.

Figure 4A:
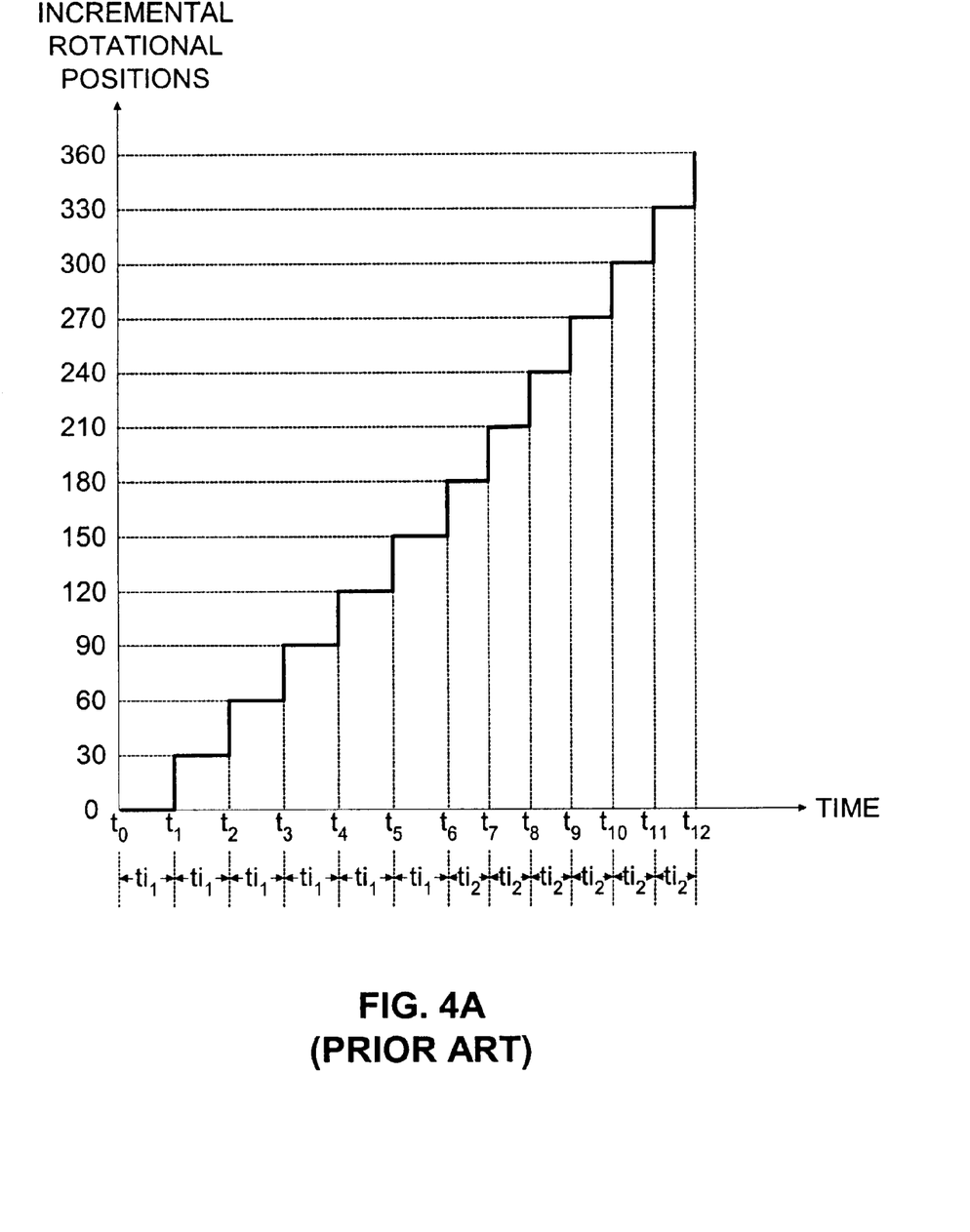
FIG. 4A illustrates a graph of incremental rotational position detections of a motor shaft experiencing an acceleration as indicated by a rotational position signal over time as known in the art.

A graph illustrating time stamps $t_{1-12}$ of each transition of rotational positional signal $RP_{S4}$ over the 360 degree rotation of motor shaft 10 and rotor 11 with motor shaft 10 and rotor 11 experiencing an increase in rotational speed between time stamp $t_6$ and time stamp $t_7$ as known in the art is shown in FIG. 4A. Referring to FIG. 4A, each 30 degree incremental rotation of motor shaft 10 and rotor 11 occurs every time interval $ti_1$ during a time period covering time stamps $t_{0-6}$ and occurs every time interval $ti_2$ during a time period covering time stamps time stamps $t_{7-12}$.

Figure 4B:
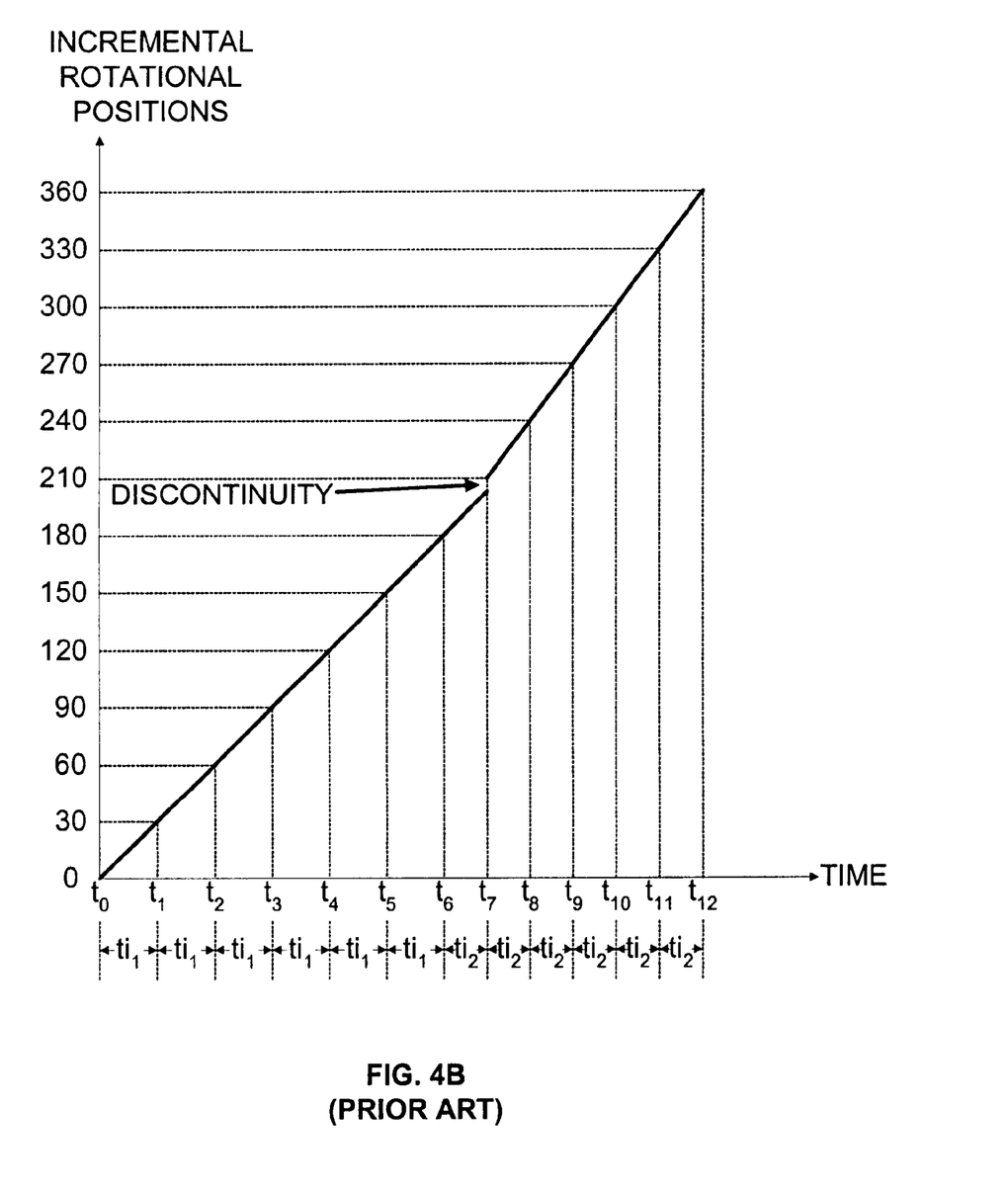
FIG. 4B illustrates a graph of a discontinuous prediction of the rotational positions of the motor shaft as a function of the FIG. 4A incremental rotational position detections as known in the art.

A graph illustrating a discontinuous prediction as known in the art of each position of motor shaft 10 and rotor 11 over the 360 degree rotation of motor shaft 10 and rotor 11 with motor shaft 10 and rotor 11 experiencing an increase in rotational speed between time stamp $t_6$ and time stamp $t_7$ is shown in FIG. 4B. Referring additionally to FIG. 4B, the discontinuous prediction of each position is based on a constant slope equal to 30 degrees divided by time interval $ti_1$ during a time period covering from time stamp to $t_0$ the moment of the speed increase and a constant slope equal to 30 degrees divided by time interval $ti_2$ during a time period covering from the moment of the speed increase to time stamp $t_{12}$.

A discontinuous prediction as shown in FIG. 4B triggers a potentially harmful torque ripple throughout motor shaft 10 when motor shaft 10 is experiencing any magnitude of acceleration or deceleration. The torque ripple also reduces the economic operation of motor shaft 10. Thus, prior to the present invention, there is a need for a method and device of providing a continuous prediction of the position of motor shaft 10 during an acceleration or deceleration of motor shaft 10.

SUMMARY OF THE INVENTION

The present invention relates to a method and device for predicting motor shaft positions that overcomes the aforementioned disadvantages of the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a method for predicting a plurality of rotational positions of a rotating shaft upon a first detection of a change in a rotational speed of the shaft from a first speed to a second speed. First, a first rotational position of the rotating shaft as a function of the first speed in response to the first detection of the change in rotational speed of the rotating shaft is predicted. Second, a first incremental rotational position of the rotating shaft that succeeds the first rotational position as predicted is determined. Third, a time interval between the first rotational position as predicted and the incremental rotational position as determined is estimated. Fourth, a prediction slope is estimated as a function of the time interval as estimated, and a differential between the first rotational position as predicted and the incremental rotational position as determined. Finally, a continuous prediction of the plurality of rotational positions of the shaft rotating at the second speed is generated as a function of the prediction slope as estimated.

A second form of the present invention is a system comprising a shaft, two or more sensors, and a controller. The shaft is operable to be rotated over a range of rotation including a plurality of incremental rotational positions. The sensors are operable to provide signals in digital form as an indication of a detection of each rotation of the shaft to one of the incremental rotational positions. The controller is operable to generate a continuous prediction of each rotational position of the shaft over the range of rotation in response to each detection of each rotation of the motor shaft to one of the incremental rotational positions.

The foregoing forms, and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 5:
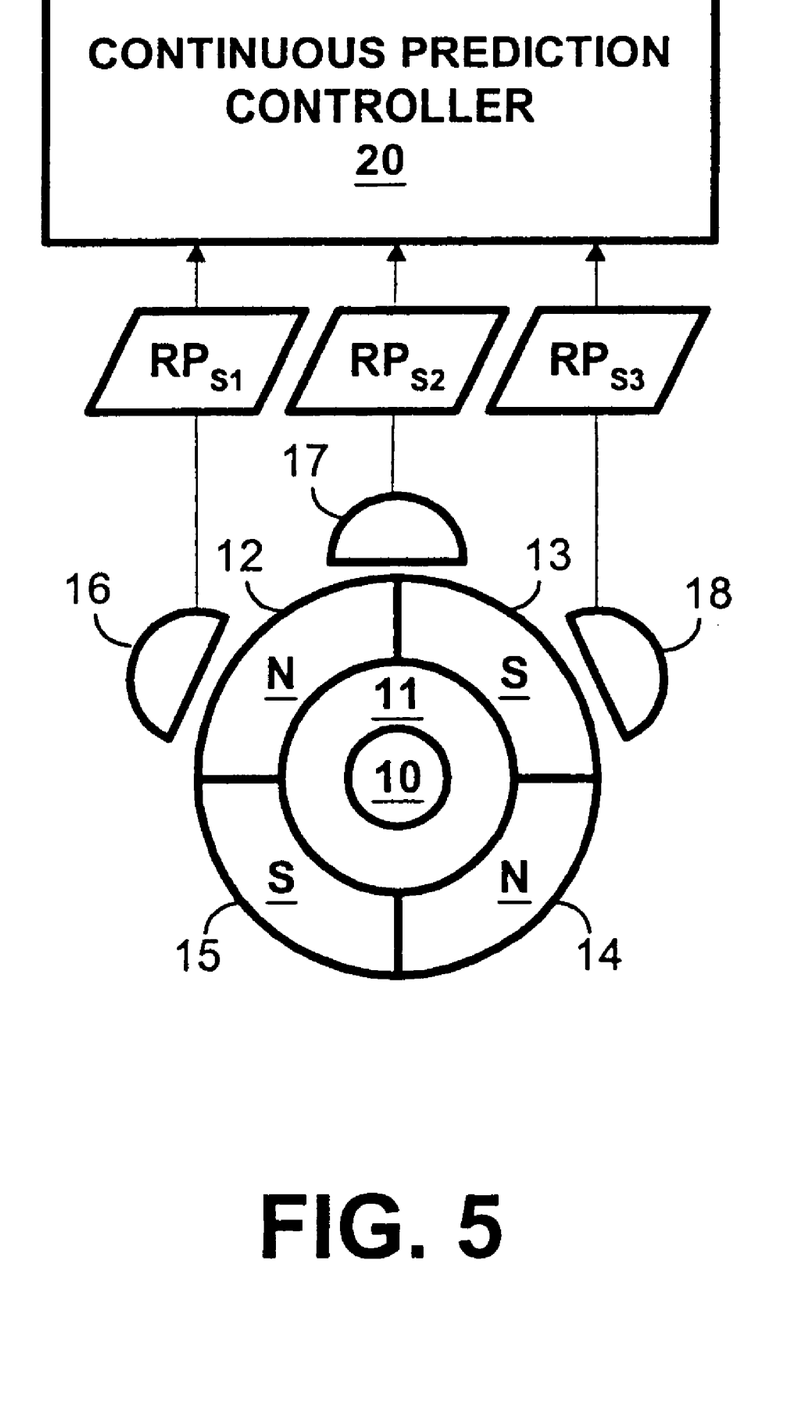
FIG. 5 is a block diagram of one embodiment of system in accordance with the present invention.
Figure 6:
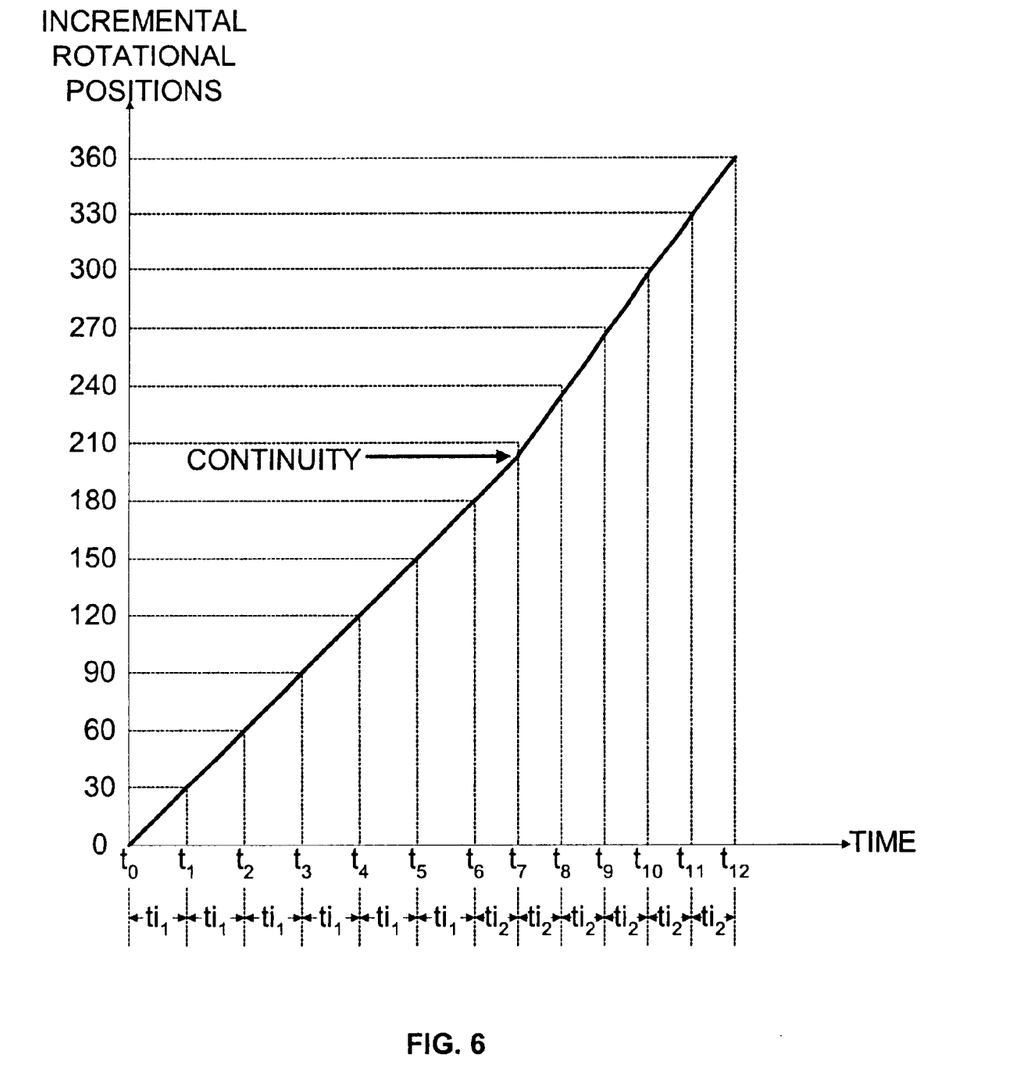
FIG. 6 illustrates a graph of a continuous prediction in accordance with the present invention of the rotational positions of the motor shaft as a function of the FIG. 4A incremental rotational position detections.

Referring to FIGS. 5 and 6, a continuous prediction controller 20 of the present invention generates a continuous prediction of rotational positions of motor shaft 10 during an acceleration of motor shaft 10 as shown in FIG. 6. Controller 20 is preferably an electronic circuit comprised of one or more components that are assembled as a common unit. The common unit may be separated from or integrated within a motor controller. Alternatively, for the multiple component embodiments, one or more of these components may be distributed throughout a vehicle housing controller 20.

Figure 7:
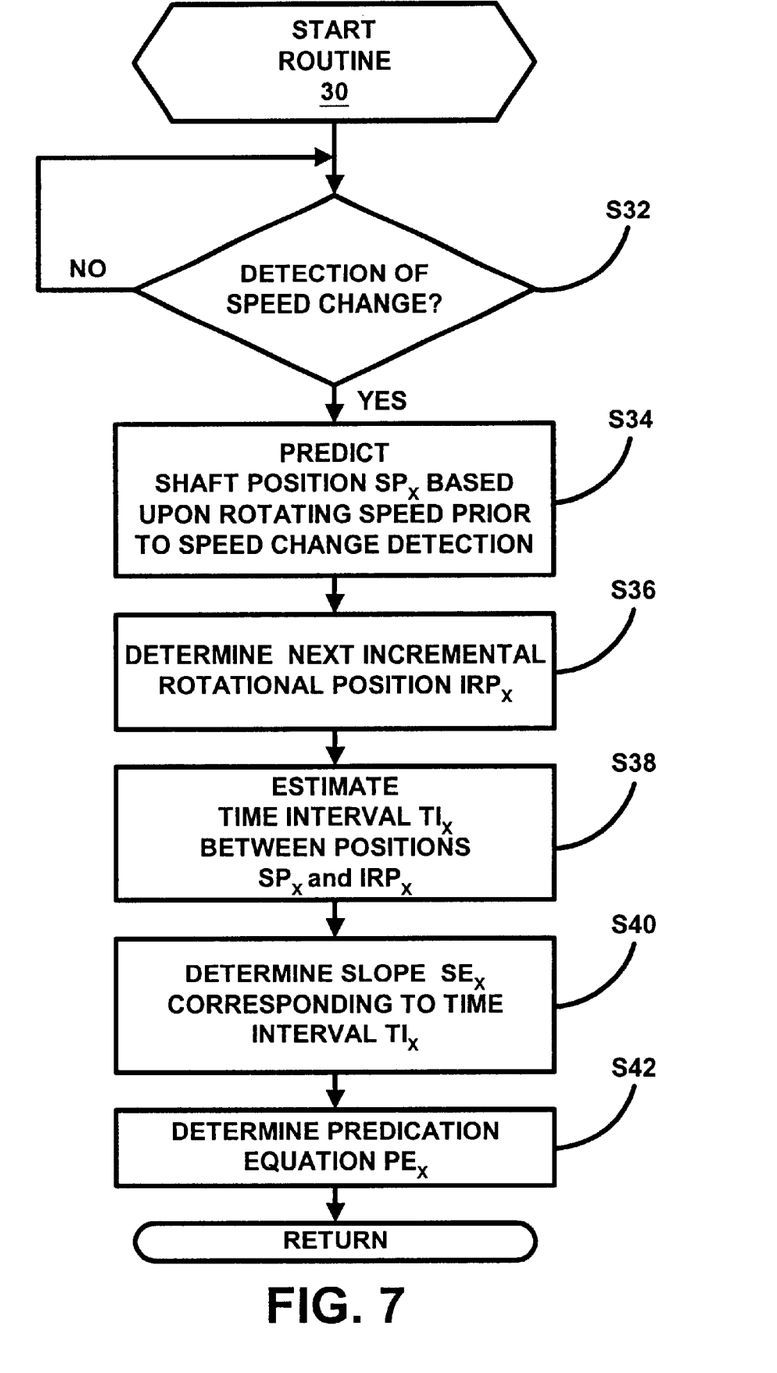
FIG. 7 is a flow chart of a continuous prediction routine in accordance with the present invention.

In one embodiment, controller 20 includes conventional circuitry for deriving rotational positional signal $RP_4$ from rotational positional signal $RP_1$, rotational positional signal $RP_2$, and rotational positional signal $RP_3$. Controller 20 further implements a continuous prediction routine 30 as illustrated in FIG. 7. For the simplicity of describing routine 30, routine 30 will now be described herein in conjunction with the change in rotational speed of motor shaft 10 between a time stamp $t_6$ and a time stamp $t_7$ as shown in FIG. 4A. From the description of routine 30 herein, those having ordinary skill in the art will appreciate the applicability of routine 30 to any speed and any speed change of motor shaft 10.

Referring additionally to FIGS. 4A and 7, during a stage S32 of routine 30, controller 30 ascertains whether a speed change in motor shaft 10 has been detected. Any detection of speed change is predicated upon each transition of rotational positional signal $RP_4$. For example, as shown in FIG. 4A, rotational positional signal $RP_4$ transitions at time stamps $t_{1-6}$ having a time interval $ti_1$, and rotational positional signal $RP_4$ transitions at a time stamp $t_7$ having a time interval $ti_2$ that is less than time interval $ti_1$. Controller 20 therefore is able to detect a speed change of motor shaft 10 between time stamp $t_6$ and time stamp $t_7$ because time interval $ti_1$ and time interval $ti_2$ are not identical.

Upon the detection, controller 20 proceeds to a stage S34 of routine 30 to predict a rotational position $RP_X$ as a function of a rotating speed of shaft 10 prior to the speed change detection. In one embodiment, controller 20 predicts rotational position $RP_X$ from the following equation [1]:

$$RP_X = [(t_7-t_6) * (30 \text{ degrees}/ti_1)] + IRP_7 \qquad [1]$$

where $(t_7-t_6)$ represents time interval $ti_2$, (30 degrees/$ti_1$) represents a slope of the rotational position predictions prior to time stamp $t_7$ as illustrated in FIG. 6, and $IRP_7$ is the incremental rotational position that was detected during time stamp $t_7$, i.e., 150 degrees as shown in FIG. 4A.

Controller 20 proceeds to a stage S36 of routine 30 to determine the incremental rotational position $IRP_X$ succeeding rotational position $RP_X$ as predicted during stage S34. In one embodiment, controller 20 computes $IRP_8$ from the following equation [2]:

$$IRP_8 = IRP_7 + 30 \text{ degrees} \qquad [2]$$

where 30 degrees is the increment value based on the spacing of sensors 16–18.

Controller 20 proceeds to a stage S38 of routine 30 to estimate a time interval $ti_x$ between rotational position $RP_X$ as predicted during stage S34 and incremental rotational positional $IRP_X$ as determined during stage S36. In one embodiment, time interval $ti_x$ is computed from the following equation [3]:

$$ti_x = [(t_7-t_6)*c_1] + [(t_6-t_5)*c_2] + [(t_5-t_4)*c_3] + [(t_4-t_3)*c_4] + [(t_3-t_2)*c_5] + [(t_2-t_1)*c_6] \qquad [3]$$

where the values of coefficients $C_{1-6}$ are selected based on an average speed of motor shaft 10 between time stamp $t_6$ and time stamp $t_7$. In one embodiment, the value of coefficient $C_1$ is 1.0 and the values of coefficients $C_2$–$C_6$ are 0.0 whereby time interval $ti_x$ is equal to time interval $ti_2$.

Controller 20 proceeds to a stage S40 of routine 30 to determine a slope $SE_X$ corresponding to time interval $ti_x$. In one embodiment, slope $SE_X$ is computed from the following equation [4]:

$$SE_X = (IRP_8 - IRP_7)/ti_x \qquad [4]$$

Controller 20 proceeds to a stage S42 of routine 30 to estimate a predication equation $PE_X$ corresponding to slope $SE_X$. In one embodiment, predication equation $PE_X$ is computed from the following equation [5]:

$$PE_X = ([t_x - t_7] * SE_X) + IRP_7 \qquad [5]$$

Controller 20 returns to stage S32 upon completion of stage S42 whereby controller 20 prediction of the shaft positions of shaft 10 are continuous from time stamp $t_7$ (moment of speed change detection) to time stamp $t_{12}$ as shown in FIG. 6.

Controller 20 may be comprised of digital circuitry, analog circuitry, or both for implementing routine 30. Also, controller 20 may be programmable, a dedicated state machine, or a hybrid combination of programmable and dedicated hardware. To implement the principals of the present invention, controller 20 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, controller 20 includes an integrated processing unit (not shown) operatively coupled to one or more solid-state memory devices (not shown) containing programming corresponding to routine 30 (FIG. 2).

In another embodiment, controller 20 includes an integrated processing unit and memory devices for implementing stage S32, stage S34, stage S36, stage S40 and stage S42 of routine 30 (FIG. 2). Controller 20 further includes a time interval estimator 50 for implementing stage S38 of routine 30 as shown in FIG. 8.

Figure 8:
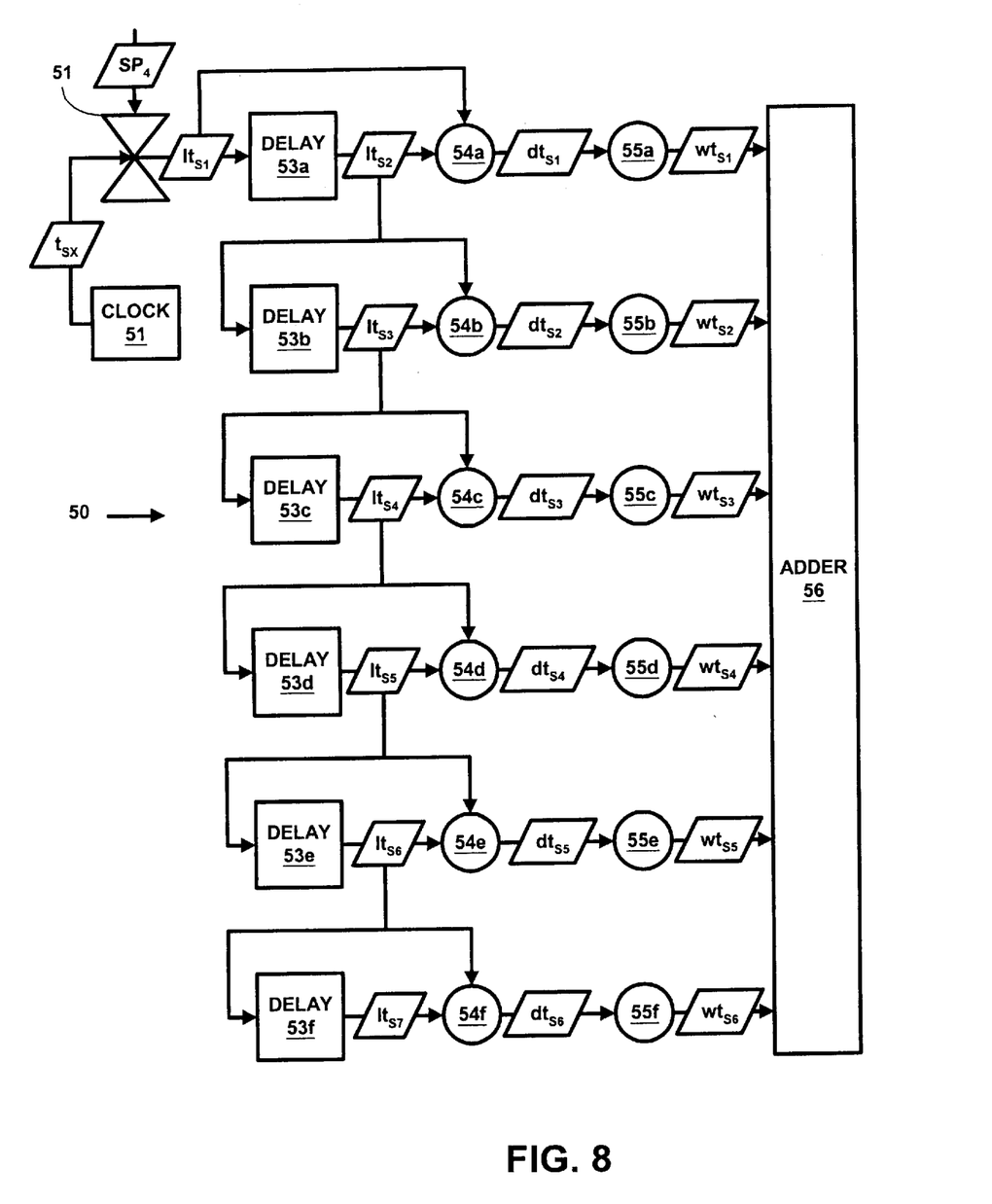
FIG. 8 is a block diagram of one embodiment of a time interval estimator in accordance with the present invention.

Referring to FIG. 8, estimator 50 includes a free running clock 51, a sample and hold device 52, six (6) delay circuits 53a–53f, six (6) subtraction units 54a–54f, six (6) multipliers 55a–55f, and an adder 56. Clock 51 generates and provides time signals $t_{SX}$ to device 52. Device 52 latches a time signal $t_{SX}$ upon each transition of rotational positional signal $RP_4$ to thereby provide a latched time signal $lt_{S1}$ to delay 53a and unit 54a. Delay 53a provides a latched time signal $lt_{S2}$ to unit 54a whereby unit 54a provides a differential time signal $dt_{S1}$ to multiplier 55a. Differential time signal $dt_{S1}$ is in indicative of a time differential between latched time signal $lt_{S1}$ and latched time signal $lt_{S2}$. In response thereto, multiplier 55a provides a weighted time signal $wt_{S1}$ to adder 56 as product of a multiplication of differential time signal $dt_{S1}$ and coefficient $C_1$ of equation (3).

Delay 53a also provides latched time signal $lt_{S2}$ to delay 53b and unit 54b. In response thereto, delay 53b provides a latched time signal $lt_{S3}$ to unit 54b whereby unit 54b provides a differential time signal $dt_{S2}$ to multiplier 55b. Differential time signal $dt_{S2}$ is in indicative of a time differential between latched time signal $lt_{S2}$ and latched time signal $lt_{S3}$. In response thereto, multiplier 55b provides a weighted time signal $wt_{S2}$ to adder 56 as product of a multiplication of differential time signal $dt_{S2}$ and coefficient $C_2$ of equation (3).

Delay 53b also provides latched time signal $lt_{S3}$ to delay 53c and unit 54c. In response thereto, delay 53c provides a latched time signal $lt_{S4}$ to unit 54c whereby unit 54c provides a differential time signal $dt_{S3}$ to multiplier 55c. Differential time signal $dt_{S3}$ is in indicative of a time differential between latched time signal $lt_{S3}$ and latched time signal $lt_{S4}$. In response thereto, multiplier 55c provides a weighted time signal $wt_{S3}$ to adder 56 as product of a multiplication of differential time signal $dt_{S3}$ and coefficient $C_3$ of equation (3).

Delay 53c also provides latched time signal $lt_{S4}$ to delay 53d and unit 54d. In response thereto, delay 53d provides a latched time signal $lt_{S5}$ to unit 54d whereby unit 54d provides a differential time signal $dt_{S4}$ to multiplier 55d. Differential time signal $dt_{S4}$ is in indicative of a time differential between latched time signal $lt_{S4}$ and latched time signal $lt_{S5}$. In response thereto, multiplier 55d provides a weighted time signal $wt_{S4}$ to adder 56 as product of a multiplication of differential time signal $dt_{S4}$ and coefficient $C_4$ of equation (3).

Delay 53d also provides latched time signal $lt_{S5}$ to delay 53e and unit 54e. In response thereto, delay 53e provides a latched time signal $lt_{S6}$ to unit 54e whereby unit 54e provides a differential time signal $dt_{S5}$ to multiplier 55e. Differential time signal $dt_{S5}$ is in indicative of a time differential between latched time signal $lt_{S5}$ and latched time signal $lt_{S6}$. In response thereto, multiplier 55e provides a weighted time signal $wt_{S5}$ to adder 56 as product of a multiplication of differential time signal $dt_{S5}$ and coefficient $C_{S5}$ of equation (3).

Delay 53e also provides latched time signal $lt_{S6}$ to delay 53f and unit 54f. In response thereto, delay 53f provides a latched time signal $lt_{S7}$ to unit 54f whereby unit 54f provides a differential time signal $dt_{S6}$ to multiplier 55f. Differential time signal $dt_{S7}$ is in indicative of a time differential between latched time signal $lt_{S6}$ and latched time signal $lt_{S7}$. In response thereto, multiplier 55f provides a weighted time signal $wt_{S6}$ to adder 56 as product of a multiplication of differential time signal $dt_{S6}$ and coefficient $C_6$ of equation (3).

Adder 56 provides a time interval signal $ti_{SX}$ as an indication of time interval $ti_X$ of equation (3) that is a summation of weighted time signal $wt_{S1}$, weighted time signal $wt_{S2}$, weighted time signal $wt_{S3}$, weighted time signal $wt_{S4}$, weighted time signal $wt_{S5}$, and weighted time signal $wt_{S6}$.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for predicting a plurality of rotational positions of a rotating shaft upon a detection of a change in a rotational speed of the rotating shaft from a first speed to a second speed, the plurality of rotational positions including a plurality of incremental rotational positions of the rotating shaft, said method comprising:
   predicting a first rotational position of the rotating shaft as a function of the first speed in response to the first detection of the change in rotational speed of the rotating shaft;
   determining a first incremental rotational position of the rotating shaft that succeeds the first rotational position as predicted;
   estimating a time interval between the first rotational position as predicted and the incremental rotational position as determined;
   estimating a prediction slope as a function of the time interval as estimated, and a differential between the first rotational position as predicted and the incremental rotational position as determined; and
   generating a continuous prediction of the plurality of rotational positions of the shaft rotating at the second speed as a function of the prediction slope as estimated.

2. A system comprising:
   a shaft operable to be rotated over a range of rotation including a plurality of incremental rotational positions;
   a plurality of sensors operable to provide a plurality of signals as an indication of a detection of each rotation of said shaft to one of said incremental rotational positions;
   a controller operable to generate a continuous prediction of each rotational position of said shaft over the range of rotation in response to each detection of each rotation of said shaft to one of said incremental rotational positions;
   wherein said controller includes a means for detecting a change in a rotational speed of said shaft from a first speed to a second speed; and
   said controller further includes a means predicting a first rotational position of said shaft as a function of said first speed in response to a detection of said change in said rotational speed of said shaft.

3. The system of claim 2, wherein
   said controller further includes a means for determining a first incremental rotational position of said shaft that succeeds said first rotational position as predicted.

4. The system of claim 3, wherein
   said controller further includes a means for estimating a time interval between said first rotational position as predicted and said incremental rotational position as determined.

5. The system of claim 4, wherein
   said controller further includes a means for estimating a prediction slope as a function of said time interval as estimated, and a differential between said first rotational position as predicted and said incremental rotational position as determined.

6. The system of claim 5, wherein
   said controller further include a means for generating a continuous prediction of said plurality of rotational positions of said shaft rotating at said second speed as a function of said prediction slope as estimated.

7. A controller for predicting a plurality of rotational positions of a rotating shaft upon a detection of a change in a rotational speed of the rotating shaft from a first speed to a second speed, the plurality of rotational positions including a plurality of incremental rotational positions of the rotating shaft, said controller comprising:
   means for predicting a first rotational position of the rotating shaft as a function of the first speed in response to the detection of the change in rotational speed of the rotating shaft;
   means for determining a first incremental rotational position of the rotating shaft that succeeds the first rotational position as predicted;
   means for estimating a time interval between the first rotational position as predicted and the incremental rotational position as determined;
   means for estimating a prediction slope as a function of the time interval as estimated, and a differential between the first rotational position as predicted and the incremental rotational position as determined; and
   means for generating a continuous prediction of the plurality of rotational positions of the shaft rotating at the second speed as a function of the prediction slope as estimated.

8. A method for predicting a plurality of rotational positions of a rotating shaft, the plurality of rotational positions including a plurality of incremental rotational positions of the rotating shaft, said method comprising:
   detecting said shaft being rotated to a first incremental rotational position of the plurality of incremental rotational positions;
   detecting said shaft being rotated to a second incremental rotational position of the plurality of incremental rotational positions;
   determining a change in rotational speed of the rotating shaft from a first speed to a second speed, said change in rotational speed occurring between a detection of said first incremental rotational position and a detection of said second incremental rotational position;
   estimating a prediction slope as a function of the second speed; and
   generating a continuous prediction of the plurality of rotational positions of the shaft rotating at the second speed as a function of said prediction slope.

9. A system for predicting a plurality of rotational positions of a rotating shaft, the plurality of rotational positions including a plurality of incremental rotational positions of the rotating shaft, said system comprising:
   a plurality of sensors operable to provide signals indicative of a detection of the shaft being rotated to a first incremental rotational position of the plurality of incremental rotational positions and indicative of a detection of the shaft being rotated to a second incremental rotational position of the plurality of incremental rotational positions; and a controller operable to determine a change in rotational speed of the rotating shaft from a first speed to a second speed, said change in rotational speed occurring between a detection of said first incremental rotational position and a detection of said second incremental rotational position, wherein said controller farther includes a means for generating a continuous prediction of the plurality of rotational positions of the shaft rotating at the second speed.

* * * * *